US012415104B2

(12) United States Patent
Xu et al.

(10) Patent No.: US 12,415,104 B2
(45) Date of Patent: Sep. 16, 2025

(54) FOAM PROPORTIONAL MIXING DEVICE

(71) Applicant: Tyco Fire Products LP, Cranston, RI (US)

(72) Inventors: Jun Xu, Shanghai (CN); Shijie Tu, Shanghai (CN); Dong Han, Shanghai (CN); Zhengxi Ju, Shanghai (CN); Jinyu Ran, Shanghai (CN); Chengyu Wang, Shanghai (CN)

(73) Assignee: Tyco Fire Products LP, Cranston, RI (US)

( * ) Notice: Subject to any disclaimer, the term of this patent is extended or adjusted under 35 U.S.C. 154(b) by 308 days.

(21) Appl. No.: 18/250,667

(22) PCT Filed: Nov. 11, 2021

(86) PCT No.: PCT/CN2021/130160
§ 371 (c)(1),
(2) Date: Apr. 26, 2023

(87) PCT Pub. No.: WO2022/100673
PCT Pub. Date: May 19, 2022

(65) Prior Publication Data
US 2023/0405377 A1 Dec. 21, 2023

(30) Foreign Application Priority Data
Nov. 12, 2020 (CN) ......................... 202011260021.9
Nov. 12, 2020 (CN) ......................... 202022614332.2

(51) Int. Cl.
*A62C 5/02* (2006.01)

(52) U.S. Cl.
CPC ..................................... *A62C 5/02* (2013.01)

(58) Field of Classification Search
CPC . A62C 5/02; A62C 5/027; F04C 2/126; F04C 11/001; F04C 11/003; F04C 13/00;
(Continued)

(56) References Cited

U.S. PATENT DOCUMENTS 2,368,019 A * 1/1945 Guibert .................. F04C 2/126 73/261
4,448,256 A 5/1984 Eberhardt et al.
5,992,230 A * 11/1999 Scarpa ...................... G01F 3/10 73/261

FOREIGN PATENT DOCUMENTS

CN 102644551 A 8/2012
CN 204283712 U 4/2015
(Continued)

OTHER PUBLICATIONS

China National Intellectual Property Administration as International Search Authority; International Search Report and Written Opinion; International Patent Application No. PCT/CN2021/130160; Jan. 27, 2022; 14 pages.
(Continued)

*Primary Examiner* — Darren W Gorman
(74) *Attorney, Agent, or Firm* — Foley & Lardner LLP

(57) ABSTRACT

A foam proportional mixing device includes a Roots pump and a gear pump. The Roots pump comprises a Roots pump inlet, a pair of rotors and a fluid guide member. The fluid guide member is arranged in the Roots pump inlet, and is configured to guide fluid to flow to the pair of rotors and provide driving forces to the pair of rotors for rotating same in opposite directions from each other. The gear pump includes a pair of gears. The foam proportional mixing device includes a rotor shaft of one rotor in the pair of rotors of the Roots pump is connected to a gear shaft of one gear in the pair of gears of the gear pump, such that the one rotor drives the one gear to rotate.

18 Claims, 6 Drawing Sheets

(58) Field of Classification Search
CPC .... F04C 13/001; F04C 13/002; F04C 13/004; F04C 18/126
See application file for complete search history.

(56) References Cited

FOREIGN PATENT DOCUMENTS

| | | | | | |
|---|---|---|---|---|---|
| CN | 107288869 A | | 10/2017 | | |
| CN | 107339188 A | | 11/2017 | | |
| CN | 110741165 A | | 1/2020 | | |
| GB | 0 859 338 A | | 1/1961 | | |
| JP | S5516612 A | | 2/1980 | | |
| KR | 20210033566 A | * | 3/2021 | ............... | A62C 5/02 |

OTHER PUBLICATIONS

Wu et al., General Special Vehicles and Handling Machinery Operation and Maintenance, 1st Edition, by Sheqiang, National Defense Industry Press, Jun. 5, 2025 (pp. 199-200—4 pages).

* cited by examiner

FOAM PROPORTIONAL MIXING DEVICE

CROSS-REFERENCE TO RELATED APPLICATIONS

This application is the U.S. National Stage Application of International Application No. PCT/CN2021/130160, filed Nov. 11, 2021, which claims the benefit of and priority to Chinese Patent Application No. 202011260021.9, filed Nov. 12, 2020, and Chinese Patent Application No. 202022614332.2, filed Nov. 12, 2020, the entire disclosures of which are incorporated by reference herein.

TECHNICAL FIELD

The present disclosure relates to the technical field of fire safety, in particular to a foam proportional mixing device.

BACKGROUND ART

A foam fire extinguishing system is an important facility to ensure fire safety, which is widely used in tunnels, warehouses, oil depots, and other buildings, and has a targeted effect on the prevention of class A, class B, and class F fires. A foam proportional mixing device is a core component of the foam fire extinguishing system. The existing pressure-type foam proportional mixing device takes the Venturi tube as a core component. When a water pump works normally, a proportional mixer sucks a foam concentrate into a fire-fighting pipe by means of the Venturi tube to mix with fire-fighting water. The foam concentrate and the fire-fighting water are sprayed out by means of a spray gun for fire-fighting operations after being mixed.

SUMMARY OF THE INVENTION

The present disclosure provides a foam proportional mixing device, which uses a Roots pump as a core component, and can achieve the function of proportional mixing of foam and water by means of a simple and compact structure. Moreover, the device is convenient to use and can comply with fire-fighting work on various occasions.

In one aspect, the present disclosure provides a foam proportional mixing device, the foam proportional mixing device comprising a Roots pump and a gear pump. The Roots pump comprises a Roots pump housing, a Roots pump inlet and a Roots pump outlet, a pair of rotors, and a fluid guide member. A Roots pump cavity is formed in the Roots pump housing. The Roots pump inlet and the Roots pump outlet are respectively arranged on two opposite sides of the Roots pump housing, and the Roots pump inlet and the Roots pump outlet are respectively in communication with the Roots pump cavity. The pair of rotors are located in the Roots pump cavity. The fluid guide member is arranged in the Roots pump inlet, and is configured to guide a fluid to flow to the pair of rotors and provide driving forces to the pair of rotors for rotating same in opposite directions from each other. The gear pump comprises a gear pump housing and a pair of gears. A gear pump cavity is formed in the gear pump housing, a gear pump inlet and a gear pump outlet are respectively provided on two opposite sides of the gear pump housing, and the gear pump outlet is in fluid communication with the Roots pump cavity. The pair of gears are located in the gear pump cavity. Here, the foam proportional mixing device is configured as follows: a rotor shaft of one rotor in the pair of rotors of the Roots pump is connected to a gear shaft of one gear in the pair of gears of the gear pump, so as to drive the one gear by means of the one rotor to rotate.

According to the foam proportional mixing device described above, the Roots pump further comprises a Roots pump inlet pipe connected to an outer side of the Roots pump housing, and the Roots pump inlet is partially formed in the Roots pump inlet pipe.

According to the foam proportional mixing device described above, the Roots pump further comprises a foam receiving port, wherein the foam receiving port is arranged on the Roots pump inlet pipe, and the foam receiving port is in communication with the gear pump outlet, so as to fluidly communicate the gear pump outlet with the Roots pump cavity.

According to the foam proportional mixing device described above, the foam proportional mixing device further comprises a coupling, wherein the coupling is connected between the rotor shaft of the one rotor and the gear shaft of the one gear, and the coupling, the rotor shaft, and the gear shaft are arranged coaxially, so that the one rotor can drive the one gear to rotate by means of the coupling.

According to the foam proportional mixing device described above, the Roots pump housing has a height direction, the rotor shafts of the pair of Roots pump rotors both extend along the height direction, and the fluid guide member extends along the height direction of the Roots pump housing.

As in the aforementioned foam proportional mixing device, the fluid guide member comprises a pair of fluid guide surfaces, wherein the pair of fluid guide surfaces are configured as follows: when a fluid flows from the Roots pump inlet to the Roots pump cavity, the pair of fluid guide surfaces guide the fluid to form two sub-flows, and the two sub-flows flow away from each other to respectively drive the pair of rotors to rotate in opposite directions from each other.

As in the aforementioned foam proportional mixing device, the fluid guide member is substantially in a triangular prism shape, and the guide member of the triangular prism shape comprises a top surface, a bottom surface, a flow dividing edge extending between the top surface and the bottom surface, and a pair of side surfaces connected to two opposite sides of the flow dividing edge, the pair of side surfaces forming the pair of fluid guide surfaces; wherein the top surface and the bottom surface are respectively connected to an inner wall of the Roots pump inlet, and the flow dividing edge is arranged away from the Roots pump cavity.

According to the foam proportional mixing device described above, the guide member of the triangular prism shape further comprises a side surface opposite to the flow dividing edge, and the side surface opposite to the flow dividing edge is flush with an inner wall of the Roots pump housing at the position of the Roots pump inlet; and the area of the side surface opposite to the flow dividing edge is A, the opening area of the Roots pump inlet at the position of the inner wall of the Roots pump housing is S, and the area A of the side surface and the opening area S satisfy: $\frac{1}{4} \le A:S \le \frac{3}{4}$.

According to the foam proportional mixing device described above, the cross-section of the guide member of the triangular prism shape is an isosceles triangle, the pair of fluid guide surfaces correspond to two legs of the isosceles triangle, the length of the base of the isosceles triangle is b, the height of the isosceles triangle is h, and the ratio h:b between the base b and the height h satisfies: $\frac{1}{3} \le h:b \le \frac{1}{2}$.

According to the foam proportional mixing device described above, the gear pump inlet is configured to receive a foam concentrate, and the foam pump is configured to suck in the foam concentrate from the gear pump inlet and discharge the foam concentrate from the gear pump outlet; and the Roots pump inlet is configured to receive a pressure fluid and the foam concentrate from the gear pump outlet, and the Roots pump is configured to mix the pressure fluid and the foam concentrate flowing in from the Roots pump inlet pipe in the Roots pump cavity and discharge same from the Roots pump outlet.

In the present disclosure, the Roots pump is applied to the foam proportional mixing device, and the foam proportional mixing device is enabled to have a compact structure by utilizing the small size of Roots pump, so as to facilitate the application of the foam proportional mixing device to various fire-fighting occasions. At the same time, in the present disclosure, a fluid guide member is added to the Roots pump, and the Roots pump can realize the normal rotation of the rotor only under the action of the kinetic energy of the pressure fluid without the need for additional power by utilizing the flow guiding effect of the fluid guide member.

DETAILED DESCRIPTION OF EMBODIMENTS

Figure 1:
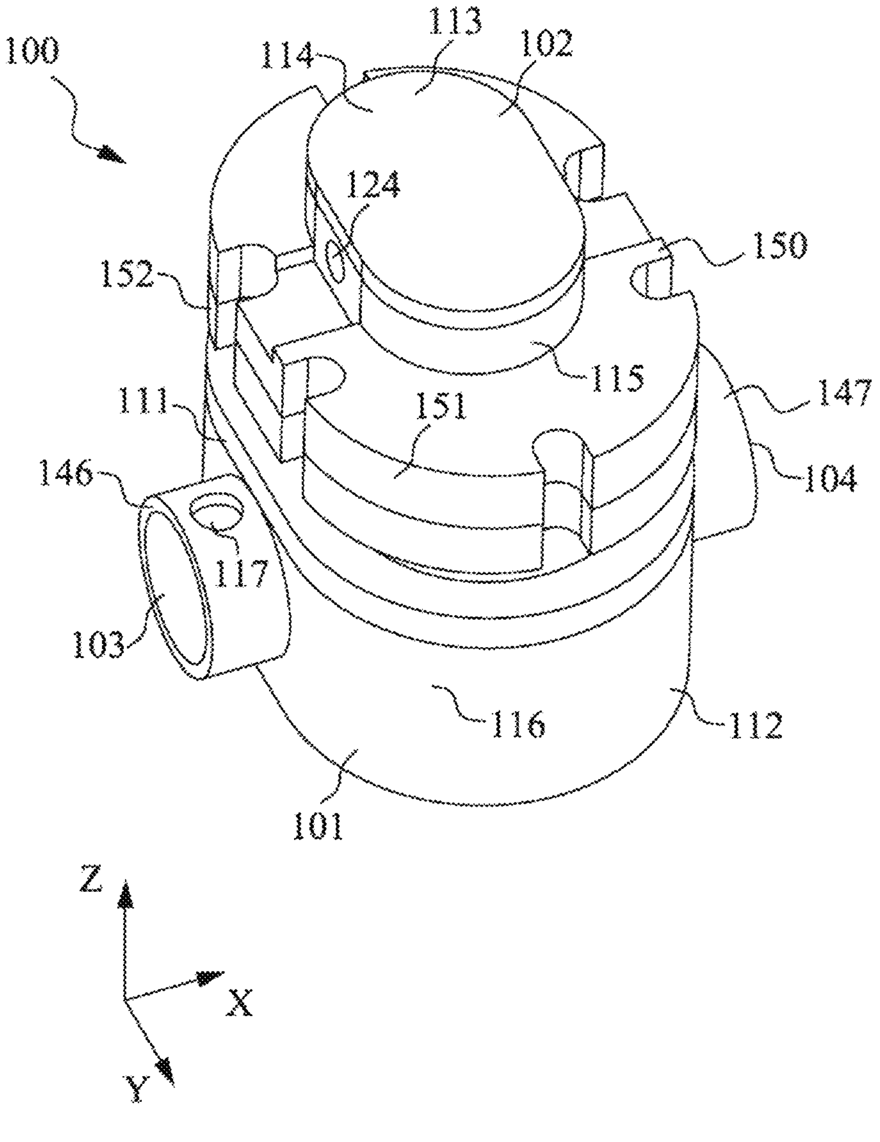
FIG. 1 shows the structure of a foam proportional mixing device of embodiments of the present disclosure.

Various specific embodiments of the present disclosure will be described below with reference to the accompanying drawings, which form a part of the Specification. It should be understood that although directional terms, such as “front,” “rear,” “upper,” “lower,” “left,” “right,” etc., are used in the present disclosure to describe various exemplary structural parts and elements of the present disclosure, these terms used herein are for illustration only and are determined based on the example orientations shown in the drawings. Since the embodiments disclosed in the present disclosure may be arranged in different orientations, these directional terms are for illustration only and should not be regarded as limitations.

FIG. 1 shows the structure of a foam proportional mixing device 100 of embodiments of the present disclosure. As shown in FIG. 1, the foam proportional mixing device 100 comprises a Roots pump 101 and a gear pump 102. Positioning is carried out according to the X-axis, Y-axis, and Z-axis directions shown in FIG. 1, and the gear pump 102 is located above the Roots pump 101 along the Z-axis direction. The gear pump 102 can draw a foam concentrate from an external foam concentrate tank (not shown in the figure), and can deliver the drawn foam concentrate to the Roots pump. The Roots pump 101 can simultaneously receive a fire-fighting water from outside and the foam concentrate from the gear pump 102, and mix the fire-fighting water and the foam concentrate to form a foam solution.

The gear pump 102 comprises a gear pump housing 113 and a pair of gears 207 (see FIG. 2A), wherein the pair of gears 207 are accommodated within the gear pump housing 113. The gear pump housing 113 comprises a gear pump upper cover 114 and a gear pump lower housing 115. A gear pump inlet 124 and a gear pump outlet 205 are respectively provided on two opposite sides of the gear pump housing 113 in the X-axis direction (see FIG. 2B). In the embodiments of the present disclosure, both the gear pump inlet 124 and the gear pump outlet 205 are located on the gear pump lower housing 115. Here, the gear pump inlet 124 is used to connect with the external foam concentrate tank to receive the foam concentrate from the foam concentrate tank, and the gear pump outlet 205 is used to discharge the foam concentrate.

The Roots pump 101 comprises a synchronous gear outer casing 150, a pair of synchronous gears 201 (see FIG. 2A and FIG. 2B), a Roots pump housing 116, a pair of rotors 203 (see FIG. 2A and FIG. 2B), a Roots pump inlet pipe 146, and a Roots pump outlet pipe 147, wherein the pair of rotors 203 are accommodated in the Roots pump housing 116. As shown in FIG. 1, the synchronous gear outer casing 150 is arranged between the gear pump housing 113 and the Roots pump housing 116 for accommodating the pair of synchronous gears 201. The synchronous gear outer casing 150 comprises a synchronous gear upper casing 151 and a synchronous gear lower casing 152, wherein the synchronous gear upper casing 151 is in contact with the gear pump lower housing 115. The synchronous gear upper casing 151 and the synchronous gear lower casing 152 jointly define an accommodating space of the pair of synchronous gears 201.

The Roots pump housing 116 has a height direction. As shown in FIG. 1, the height direction of the Roots pump housing 116 is consistent with the Z-axis direction. The Roots pump housing 116 comprises a Roots pump upper cover 111 and a Roots pump lower housing 112, wherein the Roots pump upper cover 111 is in contact with the synchronous gear lower casing 152. The Roots pump upper cover 111 and the Roots pump lower housing 112 jointly define an accommodating space of the pair of synchronous gears 201. The Roots pump inlet pipe 146 and the Roots pump outlet pipe 147 are respectively arranged on two opposite sides of the Roots pump housing 116. In the embodiments of the present disclosure, the Roots pump inlet pipe 146 and the Roots pump outlet pipe 147 are both located on the Roots pump lower housing 112. Both the Roots pump inlet pipe 146 and the Roots pump outlet pipe 147 are round pipes, and extend in the X-axis direction. The Roots pump inlet pipe 146 is located on the left side of the Roots pump housing 116, and a Roots pump inlet 103 is formed in a pipe opening of the Roots pump inlet pipe 146 for receiving a pressure fluid to drive the pair of rotors 203 to rotate. In the embodiments of the present disclosure, the pressure fluid is a fire-fighting water. The Roots pump inlet pipe 146 can be connected to an external fire-fighting water supply end by means of an external pipe (not shown in the figure), so that the fire-fighting water from the fire-fighting water supply end can enter the Roots pump inlet 103 by means of the pipe opening of the Roots pump inlet pipe 146. A foam receiving port 117 is provided on the Roots pump inlet pipe 146. The foam receiving port 117 is located on an upper surface of the Roots pump inlet pipe 146 and penetrates through a pipe wall of the Roots pump inlet pipe 146, so that the foam receiving port 117 is in communication with the Roots pump inlet 103. The foam receiving port 117 has a substantially circular cross-section and can be in communication with the gear pump outlet 205 by means of an external guide pipe (not shown in the figure), so that the foam receiving port 117 can receive the foam concentrate discharged from the gear pump outlet 205. A Roots pump outlet 104 is formed in a pipe opening of the Roots pump outlet pipe 147, and the Roots pump outlet 104 is used to discharge a foam mixed water mixed with the foam concentrate and the fire-fighting water. Since the Roots pump inlet pipe 146 and the Roots pump outlet pipe 147 are respectively located on two opposite sides of the Roots pump housing 116, the Roots pump inlet 103 and the Roots pump outlet 104 are also respectively located on the two opposite sides of the Roots pump housing 116.

Figure 2A:
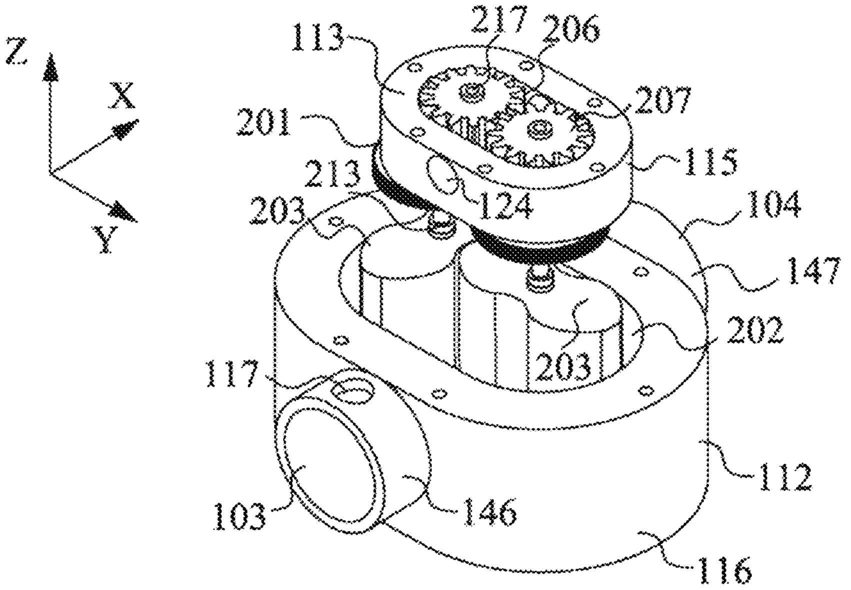
FIG. 2A and FIG. 2B respectively show the internal structure of the foam proportional mixing device in FIG. 1 at different angles.
Figure 2B:
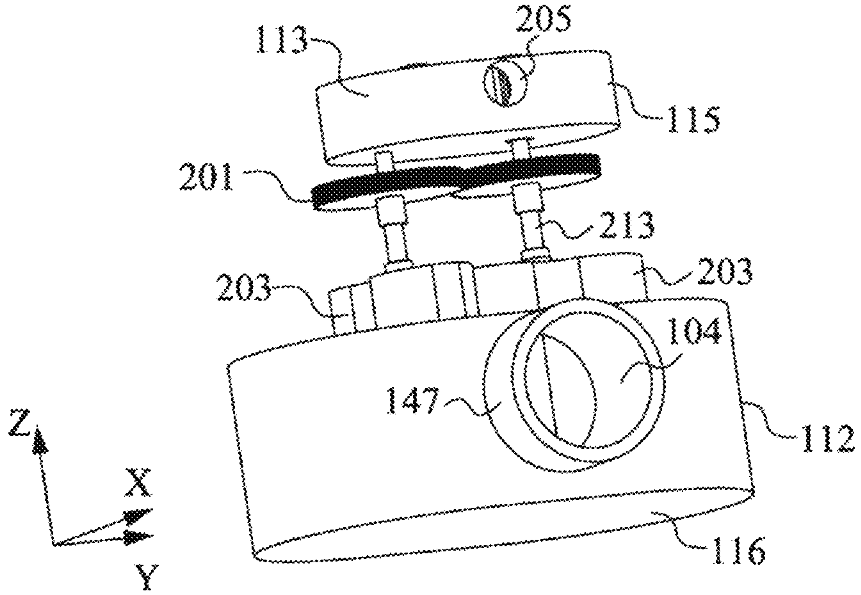

FIG. 2A and FIG. 2B respectively show the internal structure of the foam proportional mixing device 100 in FIG. 1 at different angles. In order to illustrate the internal structure of the Roots pump 101 and the gear pump 102 conveniently, the gear pump upper cover 114, the synchronous gear outer casing 150, and the Roots pump upper cover 111 are removed from the foam proportional mixing device 100 in FIG. 2A and FIG. 2B. As shown in FIGS. 2A and 2B, a gear pump cavity 206 is formed in the gear pump housing 113, and a pair of gears 207 are intermeshed in the gear pump cavity 206. The pair of gears 207 have the same size and shape, wherein a gear shaft 217 is arranged at a central position of each gear 207. Two gear shafts 217 respectively extend along the Z-axis direction, and each gear 207 can rotate around its corresponding one of the gear shafts 217. Since two gears 207 are meshed with each other, when one of the gears 207 actively rotates, the other gear 207 can be driven to rotate accordingly. The volume of the gear pump cavity 206 is matched with the size of the pair of gears 207, so that when the pair of gears 207 are meshingly rotating within the gear pump cavity 206, the gear pump 102 can drive the foam concentrate to be transferred from the gear pump inlet 124 to the gear pump outlet 205.

A Roots pump cavity 202 is formed in the Roots pump housing 116, and a pair of rotors 203 are arranged in the Roots pump cavity 202. The pair of rotors 203 have the same size and shape, and the cross-section of each rotor 203 is substantially in a shape of "8." A rotor shaft 213 is provided at the central position of each rotor 203. Two rotor shafts 213 respectively extend along the Z-axis direction and respectively constitute a rotation center of a corresponding one of the rotors 203. The volume of the Roots pump cavity 202 is matched with the size of the pair of rotors 203, so that the pair of rotors 203 can respectively rotate in the Roots pump cavity 202 around the corresponding rotor shafts 213 thereof. When the fire-fighting water with a certain flow rate flows from the Roots pump inlet 103 to the pair of rotors 203, the pair of rotors 203 can be driven to rotate by the kinetic energy of the fire-fighting water, thus driving the Roots pump 101 to operate normally. During the normal operation of the Roots pump 101, the pair of rotors 203 have relatively fixed rotation positions. However, since the cross-section of the rotors 203 is substantially in a shape of "8" and there are no intermeshing teeth or keys arranged between the pair of rotors 203, the pair of rotors 203 cannot be intermeshed and positioned with each other, and thus it is impossible to ensure that correct relative positions of the two rotors 203 are maintained at every moment during the rotation process.

In order to ensure the normal operation of the Roots pump 101, a pair of synchronous gears 201 are arranged coaxially above the pair of rotors 203 along the Z-axis direction. That is to say, one synchronous gear 201 is arranged above the rotor shaft 213 of each rotor 203, so that a corresponding one of rotors 203 and a corresponding one synchronous gear 201 can rotate synchronously. As shown in FIGS. 2A and 2B, the pair of synchronous gears 201 have the same size and shape, and are meshingly arranged at the same height. The above arrangement enables each rotor 203 to drive a corresponding one of synchronous gears 201 to rotate synchronously by means of the corresponding rotor shaft 213 thereof, and at the same time, the meshing rotation of the pair of synchronous gears 201 also affects the rotation position of the pair of rotors 203, ensuring that the correct rotation position of the pair of rotors 203 is always maintained during the rotation process. In the embodiments of the present disclosure, the outer circumference of each synchronous gear 201 is provided with a plurality of fine gear teeth, and the provision of the fine gear teeth can ensure a stable meshing rotation of the pair of synchronous gears 201, thus providing effective position guidance for the pair of rotors 201 during the operation of the Roots pump 101.

Figure 3:
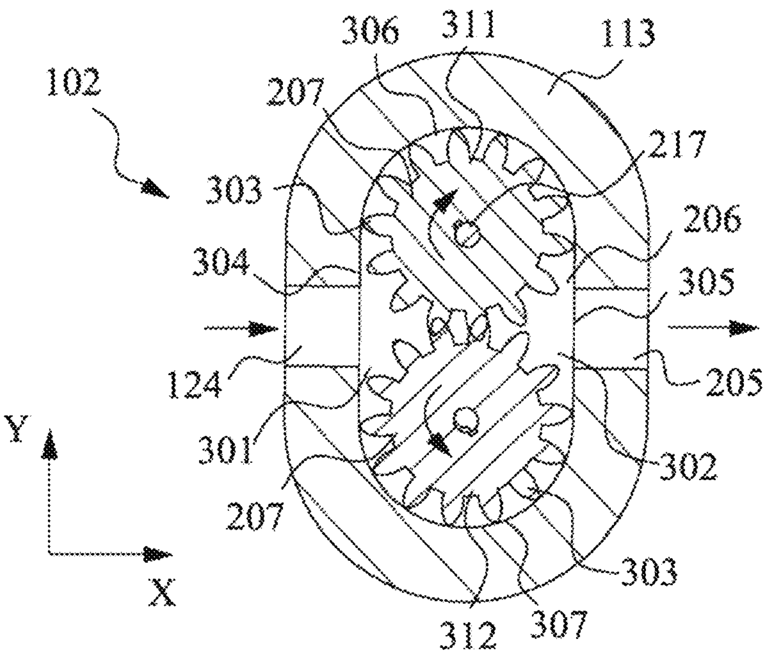
FIG. 3 is a transverse sectional view of the gear pump in FIG. 1 at the positions of a gear pump inlet and a gear pump outlet.

FIG. 3 is a transverse sectional view of the gear pump 102 in FIG. 1 at the positions of the gear pump inlet 124 and the gear pump outlet 205, showing the structure of the gear pump 102 on a plane defined by the X-axis and the Y-axis. As shown in FIG. 3, the cross-section of the gear pump cavity 206 is jointly defined by two mutually parallel straight side edges and two oppositely arranged semicircular arc side edges. Here, the two parallel straight side edges and two semicircular arc side edges respectively correspond to side walls of the gear pump cavity 206. The two mutually parallel straight side edges comprise a left side edge 304 and a right side edge 305, and the left side edge 304 and the right side edge 305 respectively extend along the Y-axis direction. The two semicircular arc side edges are respectively located on upper and lower sides of the Y-axis direction, comprising an upper side edge 306 and a lower side edge 307, wherein the upper side edge 306 and the lower side edge 307 are respectively arranged to protrude outward. As shown in FIG. 3, the gear pump inlet 124 is located in a middle position of the left side edge 304, and the gear pump outlet 205 is located in a middle position of the right side edge 305. Here, the gear pump inlet 124 penetrates through the side wall of the gear pump housing 113 corresponding to the left side edge 304, and the gear pump outlet 205 penetrates through the side wall of the gear pump housing 113 corresponding to the right side edge 305, so that the gear pump inlet 124 and the gear pump outlet 205 are respectively in fluid communication with the gear pump cavity 206.

The pair of gears 207 have the same size and shape, and are arranged side by side and top and bottom in the Y-axis direction. In the present disclosure, the gear 207 arranged above along the Y axis is defined as an upper gear 311, and the gear 207 arranged below along the Y axis is defined as a lower gear 312. The gear 207 of the present disclosure is a circular gear, and the shape of the gear 207 is matched with the shape of the gear pump cavity 206. As shown in FIG. 3, the arc diameters of the upper side edge 306 and the lower side edge 307 are respectively approximately the same as the diameters of the circles enclosed by the tips of the outer teeth of the gears 207, so that the pair of gears 207 can be accommodated in the gear pump cavity 206 and can meshingly rotate around their respective gear shafts 217. When the foam proportional mixing device 100 is in a working state, the pair of gears 207 in the gear pump 102 rotate in a direction of an arrow shown in FIG. 3. As shown in FIG. 3, the pair of gears 207 rotate in opposite directions from each other. With the meshing rotation of the pair of gears 207, when the gear teeth 303 of the upper gear 311 rotate to an upper half part, the tips of the gear teeth 303 are fitted with the corresponding side wall of the upper side edge 306; and when the gear teeth 303 of the lower gear 312 rotate to a lower half part, the tips of the gear teeth 303 are fitted with the corresponding side wall of the lower side edge 307. The structural arrangement between the pair of gears 207 and the side walls of the gear pump cavity 206 is such that: when the gear pump 102 is in a working state, the left outer circumference of meshing gears 207 and the side wall corresponding to the left side edge 304 form a left sealing area 301, and the right outer circumference of meshing gears 207 and the right side wall of the gear pump cavity 206 form a right sealing area 302.

When the gear pump 102 is in a working state, at a position where the pair of gears 207 are meshed with each other, meshing gear teeth 303 located on the left side of the gear pump 102 are gradually disengaged from meshing, and gradually withdraw from the space between the teeth, so that the volume of the left sealing area 301 increases and a partial vacuum is formed. Since the gear pump inlet 124 is connected to the external foam concentrate tank, when the pressure of the left sealing area 301 of the gear pump 102 decreases, the foam concentrate in the foam concentrate tank will be driven by the pressure to enter the left sealing area 301 by means of the gear pump inlet 124 along the direction of the arrow shown in FIG. 3. At this time, the meshing gear teeth 303 on the right side of the gear pump 102 gradually enter into meshing, so that the volume of the right sealing area 302 decreases. As the volume of the right sealing area 302 decreases, the foam concentrate in the right sealing area 302 is gradually squeezed out and discharged from the gear pump outlet 205 along the direction of the arrow in FIG. 3. When the gear pump 102 rotates continuously, the gear teeth of the gear 207 of the left sealing area 301 are gradually disengaged from meshing, so that the left sealing area 301 continuously sucks the foam concentrate from the foam concentrate tank due to the increase of the sealing volume and the decrease of the pressure, and at the same time, the gear teeth of the gear 207 of the right sealing area 302 are gradually meshed, so that the right sealing area 302 continuously discharges the foam concentrate from the gear pump outlet 205 due to the decrease of the sealing volume.

Figure 4:
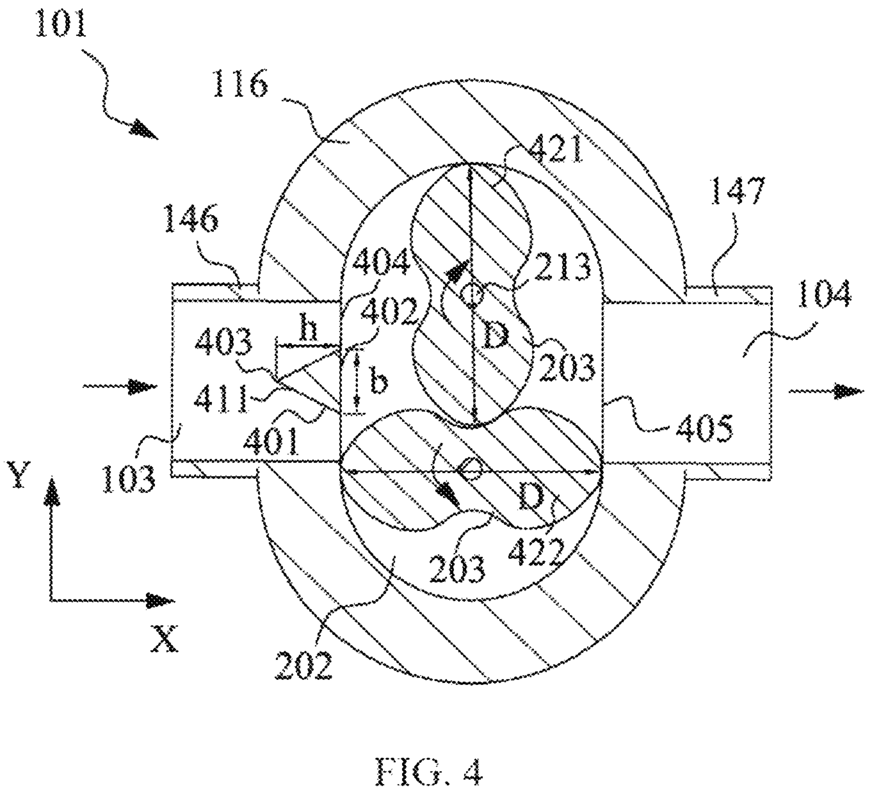
FIG. 4 is a transverse sectional view of the Roots pump in FIG. 1 at the positions of a Roots pump inlet and a Roots pump outlet.

FIG. 4 is a transverse sectional view of the Roots pump 101 in FIG. 1 at the positions of the Roots pump inlet 103 and the Roots pump outlet 104, showing the structure of the Roots pump 101 on the plane defined by the X-axis and the Y-axis. As shown in FIG. 4, the cross-section of the Roots pump cavity 202 is also jointly defined by two mutually parallel straight side edges and two oppositely arranged semicircular arc side edges. Here, the two parallel straight side edges and the two semicircular arc side edges respectively correspond to the side walls of the Roots pump cavity 202. The two mutually parallel straight side edges respectively extend along the Y-axis direction, and the two semicircular arc side edges respectively protrude outwards and are located on the upper and lower sides of the Y-axis direction. The Roots pump inlet 103 formed in the Roots pump inlet pipe 146 and the Roots pump outlet 104 formed in the Roots pump outlet pipe 147 respectively penetrate through the side walls of the Roots pump housing 116 corresponding to two parallel straight lines, so that the Roots pump inlet 103 and the Roots pump outlet 104 are respectively in fluid communication with the Roots pump cavity 202. As shown in FIG. 4, the Roots pump inlet 103 is located on the left side of the Roots pump 101, and the Roots pump outlet 104 is located on the right side of the Roots pump 101. An inlet channel 404 is formed at a position where the Roots pump inlet 103 interfaces with the Roots pump cavity 202, and an outlet channel 405 is formed at a position where the Roots pump outlet 104 interfaces with the Roots pump cavity 202. Here, the inlet channel 404 belongs to a part of the Roots pump inlet 103, the outlet channel 405 belongs to a part of the Roots pump outlet 104, and the inlet channel 404 and the outlet channel 405 respectively face the middle position of the Roots pump cavity 202.

As shown in FIG. 4, a pair of rotors 203 are adjacently arranged top and bottom in the Y-axis direction, and their corresponding two rotor shafts 213 are respectively arranged on the symmetry axis of the Roots pump cavity 202 extending in the Y-axis direction. The pair of rotors 203 comprise an upper rotor 421 and a lower rotor 422, wherein the upper rotor 421 is located above along the Y-axis direction, and the lower rotor 422 is located below along the Y-axis direction. The connecting line between the top end and the bottom end of the rotor 203 of which the cross-section is in the shape of "8" is defined as the maximum penetration line D. The diameters of the two semicircular arcs defining the Roots pump cavity 202 are slightly greater than the length of the maximum penetration line D, so that the pair of rotors 203 can be accommodated in the Roots pump cavity 202 and can rotate around their respective rotor shafts 213. In the state shown in FIG. 4, two maximum penetration lines D of the pair of rotors 203 are perpendicular to each other, the maximum penetration line D of the upper rotor 421 extends along the Y-axis direction, the maximum penetration line D of the lower rotor 422 extends along the X-axis direction, and the position of the maximum penetration line D of the lower rotor 422 substantially coincides with the diameter position of semicircular arc on a lower side. Here, in the Y-axis direction, a lower end of the upper rotor 421 is just accommodated at the waist position where the lower rotor 422 is recessed inward.

When the Roots pump 101 is in the working state, the fire-fighting water with a certain flow rate enters the Roots pump cavity 202 from the Roots pump inlet 103, and drives the pair of rotors 203 to rotate along a direction of an arrow shown in FIG. 4. As shown in FIG. 4, under normal operation states, the pair of rotors 203 rotate in opposite directions relative to each other. The inventors of the present disclosure found that when the fire-fighting water with a certain flow rate directly enters the Roots pump cavity 202 by means of the Roots pump inlet 103, part of the fire-fighting water can flow to the position in the Roots pump cavity 202 near side walls, so that the pair of rotors 203 are driven to rotate in opposite directions relative to each other. However, at this time, another part of the fire-fighting water will flow to the middle position of the Roots pump cavity 202, thereby preventing the pair of rotors 203 from rotating in the direction of the arrow shown in FIG. 4. That is to say, the inventors of the present disclosure found that when the rotors 203 are driven to rotate only by the kinetic energy of the fire-fighting water instead of being driven by a motor, the flow direction of the fire-fighting water in the Roots pump cavity 202 plays an important role in the normal rotation of the pair of rotors 203. In order to ensure the normal rotation of the pair of rotors 203 in the Roots pump cavity 202, the inventors of the present disclosure provide a fluid guide member 401 in the Roots pump inlet 103 formed in the Roots pump inlet pipe 146, and the fire-fighting water is guided by the fluid guide member 401 to flow to the position of the inner wall of the Roots pump cavity 202, so as to drive the pair of rotors 203 to rotate normally in the direction of the arrow shown in FIG. 4.

Figure 5A:
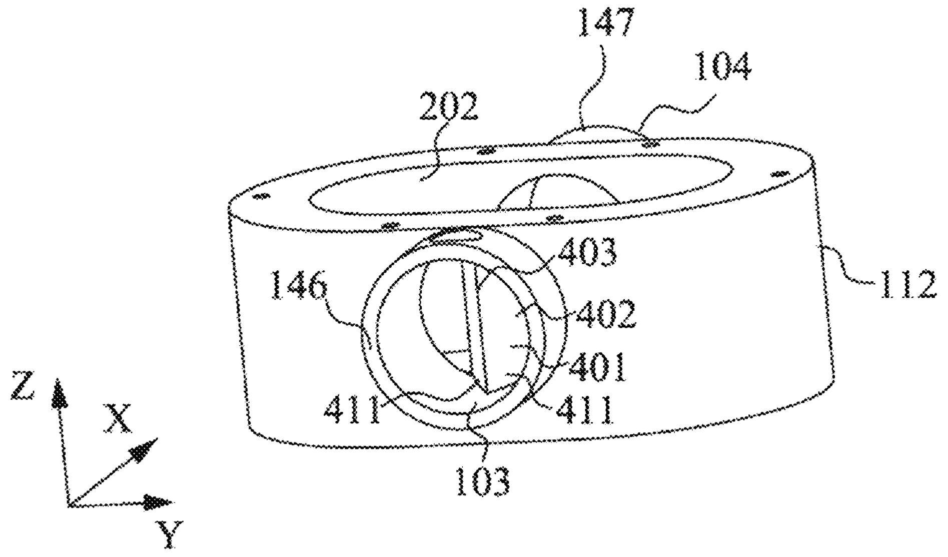
FIG. 5A and FIG. 5B respectively show the internal structure of a lower housing of the Roots pump in FIG. 1 at different angles.
Figure 5B:
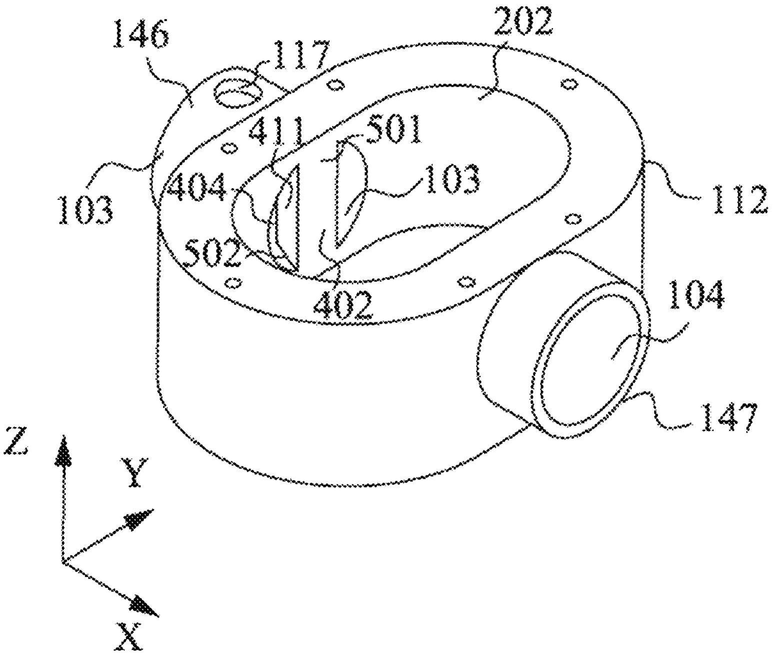

FIG. 5A and FIG. 5B respectively show the internal structure of the Roots pump lower housing 112 in FIG. 1 at different angles, for illustrating the structure of the fluid guide member 401. As shown in FIG. 5A and FIG. 5B, the fluid guide member 401 extends in the Z-axis direction within the Roots pump inlet 103. In this embodiment, the fluid guide member 401 is substantially in a triangular prism shape. The triangular prism-shaped guide member 401 comprises a top surface 501, a bottom surface 502, and three side surfaces 402. As shown in FIG. 5B, the top surface 501 is connected to a top wall of the Roots pump inlet 103, and the bottom surface 502 is connected to a bottom wall of the Roots pump inlet 103. One side surface 402 among the three side surfaces 402 is arranged on the inlet channel 404 of the Roots pump inlet 103. It can be seen in conjunction with FIG. 4 and FIG. 5B that the side surface 402 on the inlet channel 404 is approximately located in the middle position of the inlet channel 404 and is approximately flush with the side wall of the Roots pump cavity 202. The other two side surfaces 402 are arranged substantially in the direction in which the fire-fighting water enters the Roots pump inlet 103, forming a pair of fluid guide surfaces 411 for guiding the flow direction of fire-fighting water. The pair of fluid guide surfaces 411 form a flow dividing edge 403 at a position where the pair of fluid guide surfaces 411 are connected to each other, and the flow dividing edge 403 extends between the top surface 501 and the bottom surface 502 along the Z-axis direction. As shown in FIG. 5A, the flow dividing edge 403 faces the direction in which the fire-fighting water enters the Roots pump inlet 103, and is arranged away from the Roots pump cavity 202. The fluid guide surfaces 411 of the fluid guide member 401 are configured such that when the fluid flows from the Roots pump inlet 103 to the Roots pump cavity 202, the pair of fluid guide surfaces 411 can guide the fluid to form two sub-flows, and the two sub-flows flow away from each other, so as to respectively drive the pair of rotors 203 to rotate in opposite directions from each other.

As shown in FIG. 5B, in order to avoid the fluid guide member 401, a foam receiving port 117 is arranged at a distal end of the Roots pump inlet pipe 146, approximately at a position outside the flow dividing edge 403. The above arrangement enables the foam concentrate entering the Roots pump inlet 103 from the foam receiving port 117 to flow to the pair of fluid guide surfaces 411 of the fluid guide member 401 together with the fire-fighting water, and to flow together, under the guidance of the pair of fluid guide surfaces 411, in the direction in which the pair of rotors 203 can be driven to work normally in the Roots pump cavity 202. In the embodiment of the present disclosure, the foam receiving port 117 is arranged on the Roots pump inlet pipe 146 instead of on the side wall of the Roots pump cavity 202. The above arrangement enables the foam concentrate to flow into the Roots pump cavity 202 together with the fire-fighting water, thus not interfering with the normal rotation of the pair of rotors 203 in the Roots pump cavity 202. If the foam receiving port 117 is arranged on the side wall of the Roots pump cavity 202, the foam concentrate from the foam receiving port 117 will directly flow into the Roots pump cavity 202, where the flow direction of the foam concentrate is likely to be inconsistent with the rotation direction of the rotors 203 adjacent to the foam concentrate, thereby interfering with the normal rotation of the pair of rotors 203.

As shown in FIGS. 5A and 5B, the side surface 402 of the fluid guide member 401 that is arranged on the inlet channel 404 is opposite to the flow dividing edge 403. The area of the side surface 402 opposite to the flow dividing edge 403 is defined as A, and the opening area of the inlet channel 404 of the Roots pump inlet 103 at the position of the inner wall of the Roots pump housing 116 is defined as S. In order to improve the flow guide effect of the fluid guide member 401, not only to ensure the smooth flow of the fluid in the Roots pump inlet 103, but also to effectively guide the flow direction of the fluid into the Roots pump cavity 202, the area A of the side surface and the opening area S may satisfy: $\frac{1}{4} \leq A:S \leq \frac{3}{4}$.

It can be seen in conjunction with FIG. 4 and FIGS. 5A and 5B that the cross-section of the fluid guide member 401 is an isosceles triangle. Here, the two legs of the isosceles triangle correspond to a pair of fluid guide surfaces 411, the vertex of the isosceles triangle corresponds to the flow dividing edge 403, and the base of the isosceles triangle corresponds to the side surface 402 opposite to the flow dividing edge 403. As shown in FIG. 4, the base of the isosceles triangle is located in the middle position of the inlet channel 404. The length of the base of the isosceles triangle is defined as b, and the height of the isosceles triangle is defined as h. In order to effectively guide the fluid to flow toward the side wall of the Roots pump cavity 202 and ensure the flow guide effect of the fluid guide member 401, the ratio h:b between the height h and the base b may satisfy: $\frac{1}{4} \leq h:b \leq 1$. In some embodiments, the ratio h:b between the height h and the base b may also satisfy: $\frac{1}{3} \leq h:b \leq \frac{1}{2}$. In the embodiments of the present disclosure, the fluid guide member 401 is in a triangular prism shape. In other embodiments, fluid guide members 401 with other shapes can also be provided, as long as the flow direction of the fluid in the Roots pump inlet 103 can be guided, and the effective driving of the fluid on the pair of rotors 203 in the Roots pump 101 can be realized.

Figure 6A:
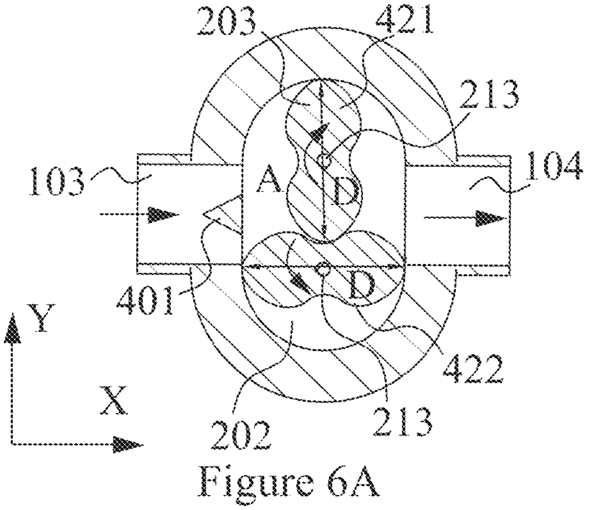
FIG. 6A to FIG. 6E respectively show the working states of a pair of rotors in FIG. 4 in one operation cycle.

FIG. 6A to FIG. 6E respectively show the working states of the pair of rotors 203 in FIG. 4 in one operation cycle, and describe the operation states of the Roots pump 101 from four typical stages. In the present disclosure, the position of the pair of rotors 203 shown in FIG. 4 is defined as an initial position, and the position of the pair of rotors 203 shown in FIG. 6A is exactly the same as that in FIG. 4. As shown in FIG. 6A, when a pressure fluid flows into the Roots pump inlet 103 from the left side along a direction of an arrow, the fluid flows to a left area A jointly enclosed and formed by the pair of rotors 203 and the side wall of the Roots pump cavity 202. Before the fluid enters the Roots pump cavity 202, the fluid guide member 401 in the Roots pump inlet 103 can guide the fluid to respectively form two sub-flows flowing upward and downward, wherein the sub-flow flowing upward flows to the upper rotor 421 and the sub-flow flowing downward flows to the lower rotor 422. The sub-flows flowing upward and downward respectively flow towards the side wall of the Roots pump cavity 202, providing a driving force for the pair of rotors 203 to rotate in opposite directions.

Figure 6B:
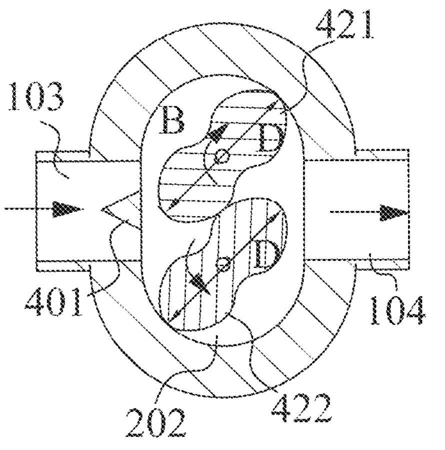

Under the rotation drive of the pressure fluid, the pair of rotors 203 rotate respectively in directions of arrows shown in FIG. 6A, so as to rotate from the position in FIG. 6A to the position in FIG. 6B. During the rotation of the pair of rotors 203 from the position shown in FIG. 6A to the position shown in FIG. 6B, the maximum penetration line D of the upper rotor 421 rotates clockwise around the rotor shaft 213 thereof from a position extending in the Y-axis direction to a position inclined to the right, and the maximum penetration line D of the lower rotor 422 rotates counterclockwise from a position extending in the X-axis direction to a position inclined to the right. In the position shown in FIG. 6B, the maximum penetration line D of the upper rotor 421 and the maximum penetration line D of the lower rotor 422 are parallel to each other. The lower right side of the upper rotor 421 is in contact with the upper left side of the lower rotor 422, and the upper rotor 421, lower rotor 422, and the left side of the side wall of the Roots pump cavity 202 are jointly enclosed to form a left area B. With the rotation of the upper rotor 421 and the lower rotor 422, the fluid flowing from the Roots pump inlet 103 into the left area A in FIG. 6A gradually moves to the left area B in FIG. 6B.

Figure 6C:
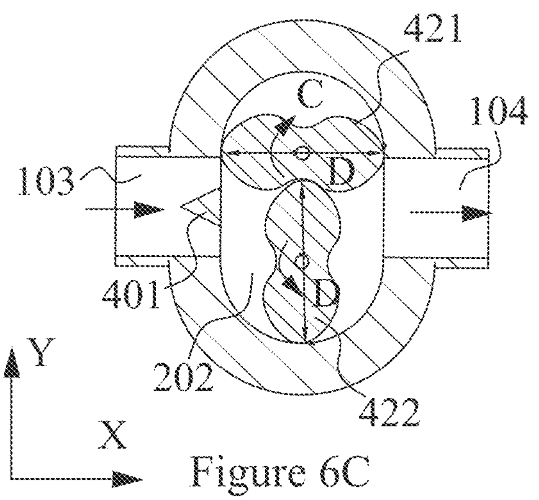
Figure 6D:
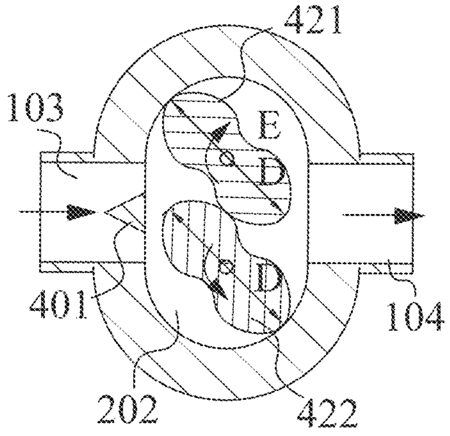
Figure 6E:
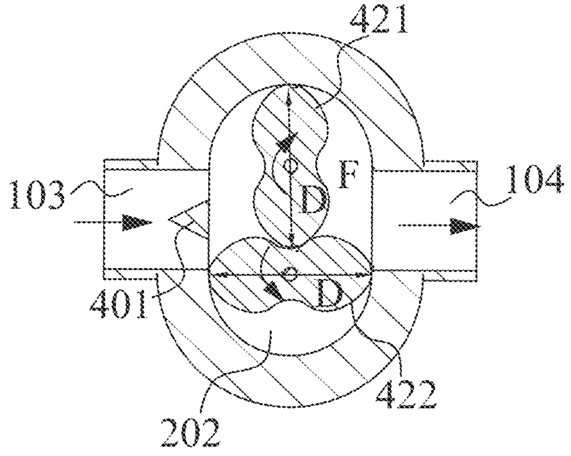

As the pressure fluid continuously flows from the Roots pump inlet 103 into the Roots pump cavity 202, the pair of rotors 203 continuously obtain the rotational kinetic energy from the pressure fluid, and then rotate from the position in FIG. 6B to the positions in FIG. 6C, FIG. 6D, and FIG. 6E in sequence. In the rotation process from the position in FIG. 6B to the position in FIG. 6C, the maximum penetration line D of the upper rotor 421 rotates clockwise from a position inclined to the right to a position extending in the X-axis direction, and the maximum penetration line D of the lower rotor 422 rotates counterclockwise from a position inclined to the right to a position extending in the Y-axis direction. In the position shown in FIG. 6C, the upper rotor 421 and the side wall of the Roots pump cavity 202 are jointly enclosed to form an upper area C. With the rotation of the upper rotor 421 and the lower rotor 422, the fluid in the left area B in FIG. 6B gradually moves to the upper area C in FIG. 6C.

In the position shown in FIG. 6D, the maximum penetration line D of the upper rotor 421 and the maximum penetration line D of the lower rotor 422 are parallel to each other, and are inclined to the left respectively. The lower left side of the upper rotor 421 is in contact with the upper right side of the lower rotor 422, and the upper rotor 421, the lower rotor 422, and the right side of the side wall of the Roots pump cavity 202 are jointly enclosed to form a right area E. With the rotation of the upper rotor 421 and the lower rotor 422, the fluid in the upper area C in FIG. 6C gradually moves to the right area E in FIG. 6D. As shown in FIG. 6D, the right area E is in communication with the Roots pump outlet 104.

During the rotation process of the pair of rotors 203 from the position shown in FIG. 6D to the position shown in FIG. 6E, the maximum penetration line D of the upper rotor 421 rotates from a position inclined to the left to a position extending in the Y-axis direction, and the lower rotor 422 rotates from a position inclined to the left to a position extending in the X-axis direction. In the position shown in FIG. 6E, the upper rotor 421, the lower rotor 422, and the right side of the side wall of the Roots pump cavity 202 are jointly enclosed to form a right area F. With the rotation of the upper rotor 421 and the lower rotor 422, the fluid in the right area E in FIG. 6D gradually moves to the right area F in FIG. 6E. Since the right area E and the right area F are respectively in communication with the Roots pump outlet 104, and the volume of the right area F is less than that of the right area E, the fluid is continuously discharged from the Roots pump outlet 104 due to being squeezed during the movement process from the right area E to the right area F.

In one rotation cycle shown in FIG. 6A to FIG. 6E, the fluid flowing from the Roots pump inlet 103 into the Roots pump cavity 202 gradually flows to the Roots pump outlet 104 along with the rotation of the pair of rotors 203. With reference to FIG. 6A to FIG. 6E, it can be seen that the position of the pair of rotors 203 in FIG. 6E is exactly the same as that in FIG. 6A, and the pair of rotors 203 in FIG. 6A can return to the initial position shown in FIG. 6A by means of a series of rotation movements in FIG. 6A to FIG. 6E, so as to continue the rotation movement in the next cycle.

Figure 7A:
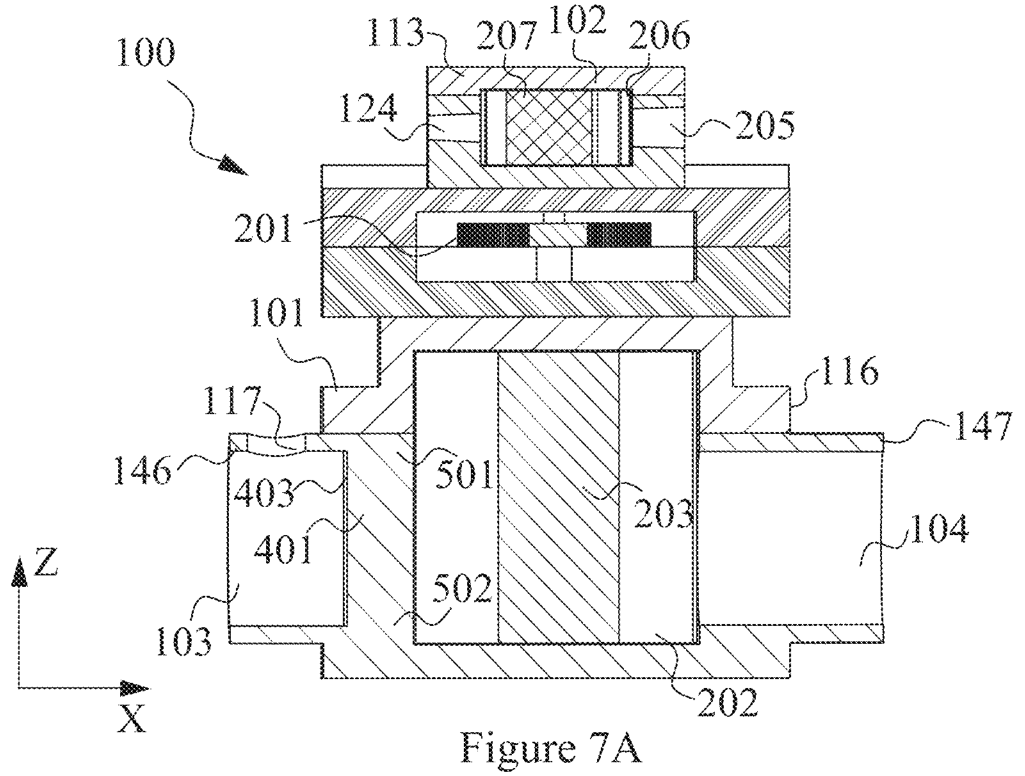
FIG. 7A and FIG. 7B are respectively longitudinal sectional views of the foam proportional mixing device in FIG. 1 at different angles.
Figure 7B:
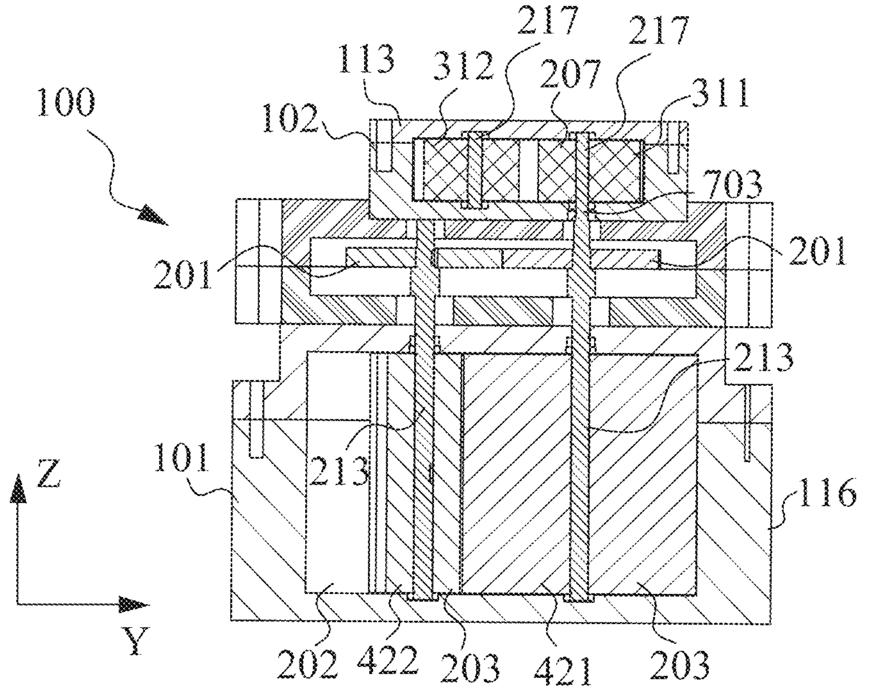

FIG. 7A and FIG. 7B are respectively longitudinal sectional views of the foam proportional mixing device 100 in FIG. 1 at different angles. Here, FIG. 7A shows a sectional view of the foam proportional mixing device 100 in the plane defined by the X-axis and the Z-axis, and FIG. 7B shows a sectional view of the foam proportional mixing device 100 in the plane defined by the Y-axis and the Z-axis. As shown in FIG. 7A and FIG. 7B, a pair of gears 207 are located at the same height of the Z-axis, a pair of synchronous gears 201 are located at the same height of the Z-axis, and a pair of rotors 203 are located at the same height of the Z-axis, which are respectively arranged in the Z-axis direction from top to bottom. In order to ensure that the pair of rotors 203 maintain the correct positions at each moment during the rotation process, one synchronous gear 201 is coaxially arranged with one rotor 203 and the other synchronous gear 201 is coaxially arranged with the other rotor 203 among two synchronous gears 201 and two rotors 203. In order to ensure the proportional mixing of fire-fighting water and foam concentrate, the rotor shaft 213 of one rotor 203 of the Roots pump 101 is connected with the gear shaft 217 of one gear 207 of the gear pump 102 in the foam proportional mixing device 100, so as to drive the gear 207 in the gear pump 102 to rotate by means of one rotor 203 in the Roots pump 101. In order to realize the coaxial connection between the rotor shaft 213 and the gear shaft 217, a coupling 703 is provided in the embodiments of the present disclosure between one of the rotor shafts 213 and one gear shaft 217 corresponding thereto. As shown in FIG. 7B, the coupling 703 is located above the synchronous gear 201 and connected between the rotor shaft 213 of the upper rotor 421 and the gear shaft 217 of the upper gear 311. However, the rotor shaft 213 of the lower rotor 422 and the gear shaft 217 of the upper gear 312 are staggered from each other without connection. The coaxial connection between the rotor shaft 213 and the gear shaft 217 enables the Roots pump 101 and the gear pump 102 to rotate synchronously.

The operation steps of the foam proportional mixing device 100 are as follows: when the foam proportional mixing device 100 starts to operate, the fire-fighting water supply end supplies the fire-fighting water with a certain flow rate from the Roots pump inlet 103 to the Roots pump 101. Under the guidance of the fluid guide member 401, the fire-fighting water in the Roots pump inlet 103 forms a specific flow direction, thereby driving the pair of rotors 203 to respectively rotate in opposite directions around their respective rotor shafts 213. During the rotation process of the pair of rotors 203, the synchronous meshing rotation of the pair of synchronous gears 201 coaxially arranged with the pair of rotors 203 causes the pair of rotors 203 to be always kept in the correct rotation position. With the rotation of the pair of rotors 203, the upper gear 311 coaxially connected with the upper rotor 421 also rotates therewith. By means of the meshing relationship between the upper gear 311 and the lower gear 312, the rotation of the upper gear 311 can drive the lower gear 312 to rotate synchronously in an opposite direction. The gear pump inlet 124 is in communication with the foam concentrate tank, and therefore, with the reverse rotation of the pair of gears 207, the gear pump 102 can draw the foam concentrate from the foam concentrate tank by means of the gear pump inlet 124, and deliver the drawn foam concentrate to the foam receiving port 117 on the Roots pump inlet pipe 146 by means of the gear pump outlet 205. After entering the Roots pump inlet 103 from the foam receiving port 117, the foam concentrate flows jointly with the fire-fighting water toward the Roots pump cavity 202 under the driving of the flow velocity of the fire-fighting water. Similarly, the fire-fighting water mixed with the foam concentrate will also be subjected to the guide function of the fluid guide member 401 during the process of the fire-fighting water flowing from the Roots pump inlet 103 towards the Roots pump cavity 202. The fire-fighting water mixed with the foam concentrate can further drive the pair of rotors 203 to rotate continuously after being guided. With the rotation of the pair of rotors 203, the fire-fighting water mixed with the foam concentrate flows into the Roots pump cavity 202 and is fully mixed in the Roots pump cavity 202 to form a foam solution. The formed foam solution is gradually discharged from the Roots pump outlet 104 with the rotation of the pair of rotors 203. In the embodiments of the present disclosure, the Roots pump outlet 104 is in communication with an external fire-fighting pipe. Since the gear pump 102 and the Roots pump 101 always rotate synchronously, the foam proportional mixing device 100 of the present disclosure can always mix the fire-fighting water and the foam concentrate at a stable ratio.

In one aspect, in the present disclosure, the Roots pump 101 is applied to the foam proportional mixing device 100, and by utilizing the advantage of the small size of the Roots pump 101, the foam proportional mixing device 100 prepared with the Roots pump 101 has a simple and compact structure. In another aspect, in the present disclosure, a fluid guide member 401 having a specific structure is provided in the Roots pump inlet 103 of the Roots pump 101, and the flow direction of the fluid flowing into the Roots pump cavity 202 is controlled by means of the fluid guide member 401, thereby utilizing the pressure of the fluid itself to drive the pair of rotors 203 in the Roots pump 101 to rotate effectively. The foam proportional mixing device 100 of the present disclosure can realize the stable mixing and delivery of the fire-fighting water and the foam concentrate according to a certain ratio only by means of the action of the pressure fluid, without the need for additional power, and has the advantages of large outlet flow, small pressure loss, and convenient and quick use. In addition, due to its small and compact size, the foam proportional mixing device 100 of the present disclosure can be installed in vertical and horizontal pipes, so as to be suitable for fire-fighting work on various occasions.

Although the present disclosure has been described in conjunction with the examples of embodiments outlined above, various alternatives, modifications, variations, improvements, and/or substantial equivalents, whether known or foreseeable now or in the near future, may be obvious to those having at least ordinary skill in the art. Accordingly, the examples of embodiments of the present disclosure, as set forth above, are intended to be illustrative, not limiting. Various changes may be made without departing from the spirit or scope of the present disclosure. Accordingly, the present disclosure is intended to embrace all known or earlier developed alternatives, modifications, variations, improvements, and/or substantial equivalents. The technical effects and technical problems in the present specification are exemplary and not limiting. It should be noted that the embodiments described in the present specification may have other technical effects and may solve other technical problems.

The invention claimed is:

1. A foam proportional mixing device, comprising:
- a Roots pump, the Roots pump comprising:
  - a Roots pump housing, wherein a Roots pump cavity is formed in the Roots pump housing;
  - a Roots pump inlet pipe connected to an outer side of the Roots pump housing and in fluid communication with the Roots pump cavity;
  - a foam receiving port arranged on the Roots pump inlet pipe;
  - a pair of rotors, the pair of rotors being located in the Roots pump cavity; and
  - a fluid guide member, wherein the fluid guide member is arranged in the Roots pump inlet pipe, and is configured to guide a fluid to flow to the pair of rotors and to provide driving forces to the pair of rotors for rotating same in opposite directions from each other; and
- a gear pump, the gear pump comprising:
  - a gear pump housing, wherein a gear pump cavity is formed in the gear pump housing, a gear pump inlet, and a gear pump outlet; and
  - a pair of gears located within the gear pump cavity, one of the pair of gears connected to one of the pair of rotors via at least one shaft;
- wherein the foam receiving port is in communication with the gear pump outlet, such that the gear pump outlet is in fluid communication with the Roots pump cavity.

2. The foam proportional mixing device according to claim 1, wherein the Roots pump further comprises a Roots pump inlet at least partially formed in the Roots pump inlet pipe and a Roots pump outlet, wherein the Roots pump inlet and the Roots pump outlet are respectively arranged on two opposite sides of the Roots pump housing, and the Roots pump inlet and the Roots pump outlet are respectively in communication with the Roots pump cavity.

3. The foam proportional mixing device of claim 1, wherein the foam proportional mixing device is configured such that a rotary shaft of one rotor in the pair of rotors of the Roots pump is connected to a gear shaft of one gear in the pair of gears of the gear pump, such that the one rotor drives the one gear to rotate, the foam proportional mixing device further comprising:
- a coupling connected between the rotary shaft of the one rotor and the gear shaft of the one gear, and the coupling, the rotary shaft, and the gear shaft are arranged coaxially, so that the one rotor can drive the one gear to rotate via the coupling.

4. The foam proportional mixing device of claim 3, wherein:
- rotary shafts of the pair of Roots pump rotors both extend along a height of the Roots pump housing, and the fluid guide member extends along the height of the Roots pump housing.

5. The foam proportional mixing device of claim 2, wherein:
- the fluid guide member comprises a pair of fluid guide surfaces, wherein the pair of fluid guide surfaces are configured as follows: when a fluid flows from the Roots pump inlet to the Roots pump cavity, the pair of fluid guide surfaces guide the fluid to form two sub-flows, and the two sub-flows flow away from each other to respectively drive the pair of rotors to rotate in opposite directions from each other.

6. The foam proportional mixing device of claim 5, wherein:

the fluid guide member is substantially in a triangular prism shape, and the fluid guide member comprises a top surface, a bottom surface, a flow dividing edge extending between the top surface and the bottom surface, and a pair of side surfaces connected to two opposite sides of the flow dividing edge, the pair of side surfaces forming the pair of fluid guide surfaces;

wherein the top surface and the bottom surface are respectively connected to an inner wall of the Roots pump inlet, and the flow dividing edge is arranged away from the Roots pump cavity.

7. The foam proportional mixing device of claim 6, wherein:

the fluid guide member further comprises a side surface opposite to the flow dividing edge, and the side surface opposite to the flow dividing edge is flush with an inner wall of the Roots pump housing at the Roots pump inlet; and an area of the side surface opposite to the flow dividing edge is A, an opening area of the Roots pump inlet at the inner wall of the Roots pump housing is S, and the area A of the side surface and the opening area S satisfy: $\frac{1}{4} \leq A:S \leq \frac{3}{4}$.

8. The foam proportional mixing device of claim 6, wherein:

a cross-section of the fluid guide member is an isosceles triangle, the pair of fluid guide surfaces correspond to two legs of the isosceles triangle, a length of a base of the isosceles triangle is b, a height of the isosceles triangle is h, and a ratio h:b between the base b and the height h satisfies: $\frac{1}{3} \leq h:b \leq \frac{1}{2}$.

9. The foam proportional mixing device of claim 2, wherein:

the gear pump inlet is configured to receive a foam concentrate, and the gear pump is configured to suck in the foam concentrate from the gear pump inlet and discharge the foam concentrate from the gear pump outlet; and the Roots pump inlet is configured to receive a pressure fluid and the foam concentrate from the gear pump outlet, and the Roots pump is configured to mix the pressure fluid and the foam concentrate flowing in from the Roots pump inlet pipe in the Roots pump cavity and discharge same from the Roots pump outlet.

10. A foam proportional mixing device, wherein the foam proportional mixing device comprises:

a pump comprising:

a housing, wherein a cavity is formed in the housing;

an inlet pipe connected to an outer side of the housing and in fluid communication with the cavity;

a foam receiving port arranged on the inlet pipe; and a pair of rotors, the pair of rotors being located in the cavity; and a gear pump, the gear pump comprising:

a gear pump housing, wherein a gear pump cavity is formed in the gear pump housing, a gear pump inlet, and a gear pump outlet; and a pair of gears located within the gear pump cavity, one of the pair of gears connected to one of the pair of rotors via at least one shaft;

wherein the foam receiving port is in communication with the gear pump outlet, such that the gear pump outlet is in fluid communication with the cavity.

11. The foam proportional mixing device of claim 10, wherein the pump further comprises:

an inlet and an outlet, wherein the inlet and the outlet are respectively arranged on two opposite sides of the housing, and the inlet and the outlet are respectively in communication with the cavity; and a fluid guide member arranged in the inlet and configured to (a) guide a fluid to flow to the pair of rotors and to (b) provide driving forces to the pair of rotors for rotating same in opposite directions from each other.

12. The foam proportional mixing device of claim 10 further comprising:

a coupling connected between a rotary shaft of one rotor of the pair of rotors and a gear shaft of one gear of the pair of gears, and the coupling, the rotary shaft, and the gear shaft are arranged coaxially, so that the one rotor can drive the one gear to rotate via the coupling.

13. The foam proportional mixing device of claim 10, wherein the pair of rotors include a pair of rotary shafts that extend along a height of the housing.

14. The foam proportional mixing device of claim 11, wherein:

the fluid guide member comprises a pair of fluid guide surfaces, wherein the pair of fluid guide surfaces are configured as follows: when a fluid flows from the inlet to the cavity, the pair of fluid guide surfaces guide the fluid to form two sub-flows, and the two sub-flows flow away from each other to respectively drive the pair of rotors to rotate in opposite directions from each other.

15. The foam proportional mixing device of claim 14, wherein:

the fluid guide member is substantially in a triangular prism shape, and the fluid guide member comprises a top surface, a bottom surface, a flow dividing edge extending between the top surface and the bottom surface, and a pair of side surfaces connected to two opposite sides of the flow dividing edge, the pair of side surfaces forming the pair of fluid guide surfaces;

wherein the top surface and the bottom surface are respectively connected to an inner wall of the inlet, and the flow dividing edge is arranged away from the cavity.

16. The foam proportional mixing device of claim 15, wherein:

the fluid guide member further comprises a side surface opposite to the flow dividing edge, and the side surface opposite to the flow dividing edge is flush with an inner wall of the housing at the inlet; and an area of the side surface opposite to the flow dividing edge is A, an opening area of the inlet at the inner wall of the housing is S, and the area A of the side surface and the opening area S satisfy: $\frac{1}{4} \leq A:S \leq \frac{3}{4}$.

17. The foam proportional mixing device of claim 16, wherein:

a cross-section of the fluid guide member is an isosceles triangle, the pair of fluid guide surfaces correspond to two legs of the isosceles triangle, a length of a base of the isosceles triangle is b, a height of the isosceles triangle is h, and a ratio h:b between the base b and the height h satisfies: $\frac{1}{3} \leq h:b \leq \frac{1}{2}$.

18. A Roots pump for a foam proportional mixing device, the Roots pump comprising:

a Roots pump housing, wherein a Roots pump cavity is formed in the Roots pump housing;

a Roots pump inlet and a Roots pump outlet, wherein the Roots pump inlet and the Roots pump outlet are respectively arranged on two opposite sides of the Roots pump housing, and the Roots pump inlet and the Roots pump outlet are respectively in communication with the Roots pump cavity;

a Roots pump inlet pipe connected to an outer side of the Roots pump housing;

a foam receiving port arranged on the Roots pump inlet pipe and in communication with an outlet of a gear pump, such that the outlet of the gear pump is in fluid communication with the Roots pump cavity;

a pair of rotors, the pair of rotors being located in the Roots pump cavity; and a fluid guide member, wherein the fluid guide member is arranged in the Roots pump inlet, and is configured to guide a fluid to flow to the pair of rotors and to provide driving forces to the pair of rotors for rotating same in opposite directions from each other.

* * * * *